United States Patent
Tsai et al.

(10) Patent No.: US 11,698,525 B2
(45) Date of Patent: Jul. 11, 2023

(54) OPTICAL MEMBER DRIVING MECHANISM

(71) Applicant: TDK TAIWAN CORP., Taoyuan (TW)

(72) Inventors: Sung-Mao Tsai, Taoyuan (TW); Shang-Hung Chen, Taoyuan (TW); Chia-Che Wu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 0 days.

(21) Appl. No.: 16/794,929

(22) Filed: Feb. 19, 2020

(65) Prior Publication Data

US 2021/0072530 A1   Mar. 11, 2021

Related U.S. Application Data

(60) Provisional application No. 62/896,943, filed on Sep. 6, 2019.

(30) Foreign Application Priority Data

Dec. 20, 2019  (EP) .................................... 19218896

(51) Int. Cl.
| | |
|---|---|
| *G03B 17/17* | (2021.01) |
| *G02B 26/08* | (2006.01) |
| *G02B 7/02* | (2021.01) |
| *G02B 13/00* | (2006.01) |
| *H04M 1/02* | (2006.01) |

(52) U.S. Cl.
CPC .............. *G02B 26/08* (2013.01); *G02B 7/02* (2013.01); *G02B 13/0015* (2013.01); *G03B 17/17* (2013.01); *H04M 1/0264* (2013.01)

(58) Field of Classification Search
CPC ...... G03B 17/17; G02B 7/02; G02B 13/0015; G02B 26/08; G02B 7/1821; G02B 7/20; G02B 7/18; G02B 7/1805; H04M 1/0264
See application file for complete search history.

(56) References Cited

U.S. PATENT DOCUMENTS

| | | | |
|---|---|---|---|
| 2011/0181740 A1* | 7/2011 | Watanabe | G03B 3/10 348/208.2 |
| 2019/0129197 A1* | 5/2019 | Kim | G03B 17/17 |
| 2020/0400464 A1* | 12/2020 | Yedid | G02B 13/0065 |

FOREIGN PATENT DOCUMENTS

| | | | | |
|---|---|---|---|---|
| CN | 110062141 | * | 7/2019 | .......... H04M 1/0264 |
| CN | 210136351 U | | 3/2020 | |
| CN | 212160198 U | | 12/2020 | |

(Continued)

OTHER PUBLICATIONS

Machine Translation of CN 110062141 (Year: 2019).*

(Continued)

*Primary Examiner* — Darryl J Collins
*Assistant Examiner* — Matthew Y Lee
(74) *Attorney, Agent, or Firm* — Muncy, Geissler, Olds & Lowe, P.C.

(57) ABSTRACT

An optical member driving mechanism is provided, including a first movable portion, a fixed portion, and a first driving assembly. The first movable portion is connected to an optical member. The first movable portion is movable relative to the fixed portion. The first driving assembly is configured to drive the first movable portion to move relative to the fixed portion.

20 Claims, 11 Drawing Sheets

(56) References Cited

FOREIGN PATENT DOCUMENTS

KR    20150124036 A  * 11/2015  ............... G02B 7/04

OTHER PUBLICATIONS

Machine Translation of KR20150124036A (Year: 2015).*
Office Action dated Apr. 7, 2021 in CN Application No. 202021170421.6, 2 pages.
Office Action dated Dec. 9, 2020 in CN Application No. 202021170421.6 (1 page).

* cited by examiner

OPTICAL MEMBER DRIVING MECHANISM

CROSS REFERENCE TO RELATED APPLICATIONS

The present application claims priority to U.S. Provisional Patent Applications No. 62/896,943, filed in Sep. 6, 2019, and Europe Patent Applications No. 19218896.9, filed on Dec. 20, 2019, which are incorporated by reference herein in their entirety.

BACKGROUND OF THE INVENTION

Field of the Invention

The application relates in general to an optical member driving mechanism, and in particular, to an optical member driving mechanism configured to drive an optical member to rotate.

Description of the Related Art

Thanks to technological advancements, the latest consumer electronic devices (such as tablet computers and smartphones) now usually include a lens module capable of aiding in photography or recording video. These electronic devices have become commonplace, and have been developed to be more convenient and thin. More and more choices are available for users to choose from. However, when a lens with long focal length is disposed in the electronic device, the thickness of the electronic device is increased, and as such it is hard to make the electronic device thin.

BRIEF SUMMARY OF INVENTION

To address the deficiencies of conventional products, an embodiment of the invention provides an optical member driving mechanism, including a first movable portion, a fixed portion, and a first driving assembly. The first movable portion is connected to an optical member. The first movable portion is movable relative to the fixed portion. The first driving assembly is configured to drive the first movable portion to move relative to the fixed portion.

In some embodiments, the optical member is configured to adjust a emission direction of light from an incident direction to an outgoing direction, and the first driving assembly is configured to drive the first movable portion to rotate around a first rotation axis relative to the fixed portion. The incident direction is not parallel to the outgoing direction, and the first rotation axis is parallel or perpendicular to the incident direction.

In some embodiments, the optical member driving mechanism further includes a second movable portion and a second driving assembly. The second driving assembly is configured to drive the second movable portion to move relative to the first movable portion and the fixed portion. At least a portion of the first driving assembly is disposed on the first movable portion, and at least a portion of the second driving assembly is disposed on the second movable portion.

In some embodiments, the first driving assembly includes a magnet and a coil respectively disposed on the first movable portion and the fixed portion, and the optical member driving mechanism further includes a plurality of wires embedded in the fixed portion. The wires are magnetic, and at least a portion of the wires correspond to the magnet.

In some embodiments, the first driving assembly includes a magnet and a coil respectively disposed on the first movable portion and the fixed portion, and the optical member driving mechanism further includes a magnetic permeability member disposed on the fixed portion and corresponding to the magnet.

In some embodiments, the optical member driving mechanism further includes a first guiding member and a second guiding member. The first guiding member is disposed on the fixed portion. The second guiding member is disposed on the first movable portion and movably connected to the first guiding member.

In some embodiments, the first guiding member is a guiding slot, and the second guiding member is a ball. The first movable portion has a depression, and the ball is accommodated in the depression.

In some embodiments, the fixed portion includes a base and a housing having a top wall. In the incident direction, the shortest distance between the first movable portion and the top wall is a first distance, the shortest distance between the first movable portion and the base is a second distance, and the second guiding member has a thickness. The thickness is greater than the sum of the first distance and the second distance.

In some embodiments, the first guiding member is a pillar, and the second guiding member is a guiding slot. The pillar protrudes from a surface of the fixed portion facing the second movable portion. Furthermore, the fixed portion further includes a receiving recess, formed on the surface and surrounding the pillar.

In some embodiments, the guiding slot of the fixed portion or the guiding slot of the first movable portion has an arc structure. The center of the arc structure is aligned with the center of the optical member as seen from the incident direction.

In some embodiments, the fixed portion includes a base and a housing having a top wall. In the incident direction, the shortest distance between the first movable portion and the top wall is a first distance, and the shortest distance between the second movable portion and the top distance is a third distance. The first distance is less than the third distance.

In some embodiments, the optical member driving mechanism further includes a shield member and an elastic member. The shield member is disposed on the edge of the optical member. The elastic member connects the first movable portion to the second movable portion. The first movable portion has an upper surface facing the top wall, and the second movable portion has a lower surface facing the base, wherein the elastic member is connected to the upper surface and the lower surface.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the optical member driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
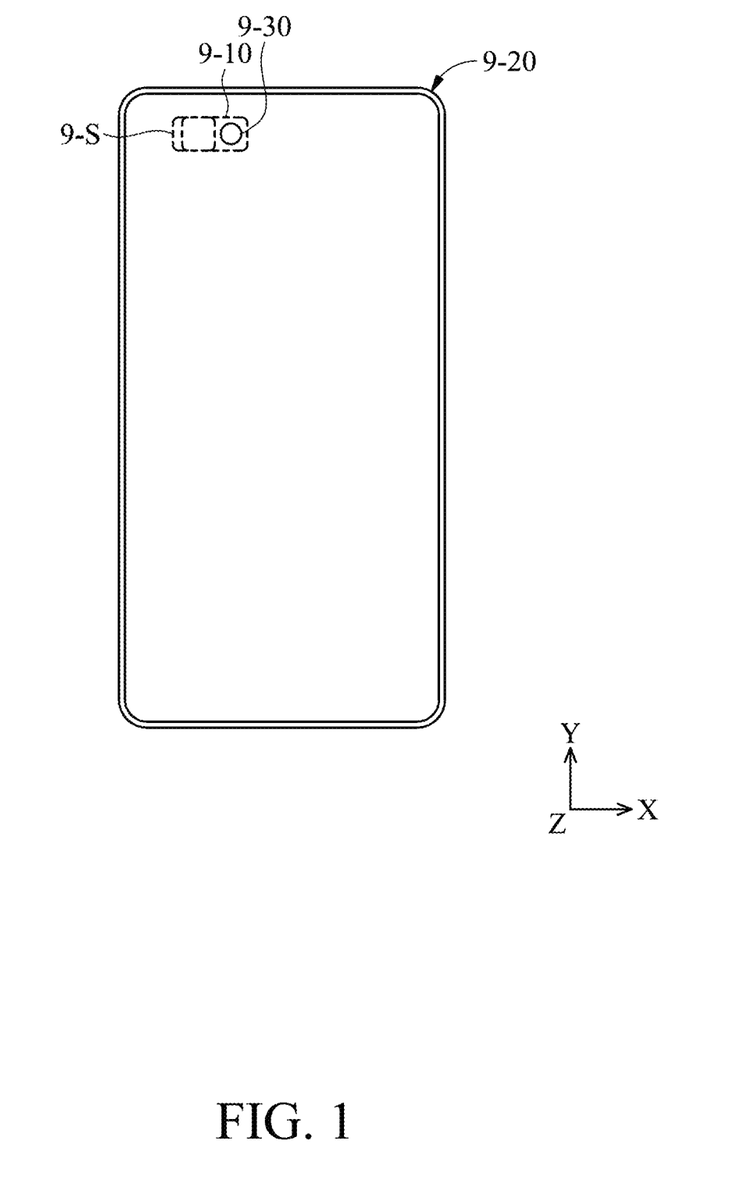
FIG. 1 is a schematic diagram of an electronic device according to an embodiment of the invention.
Figure 2:
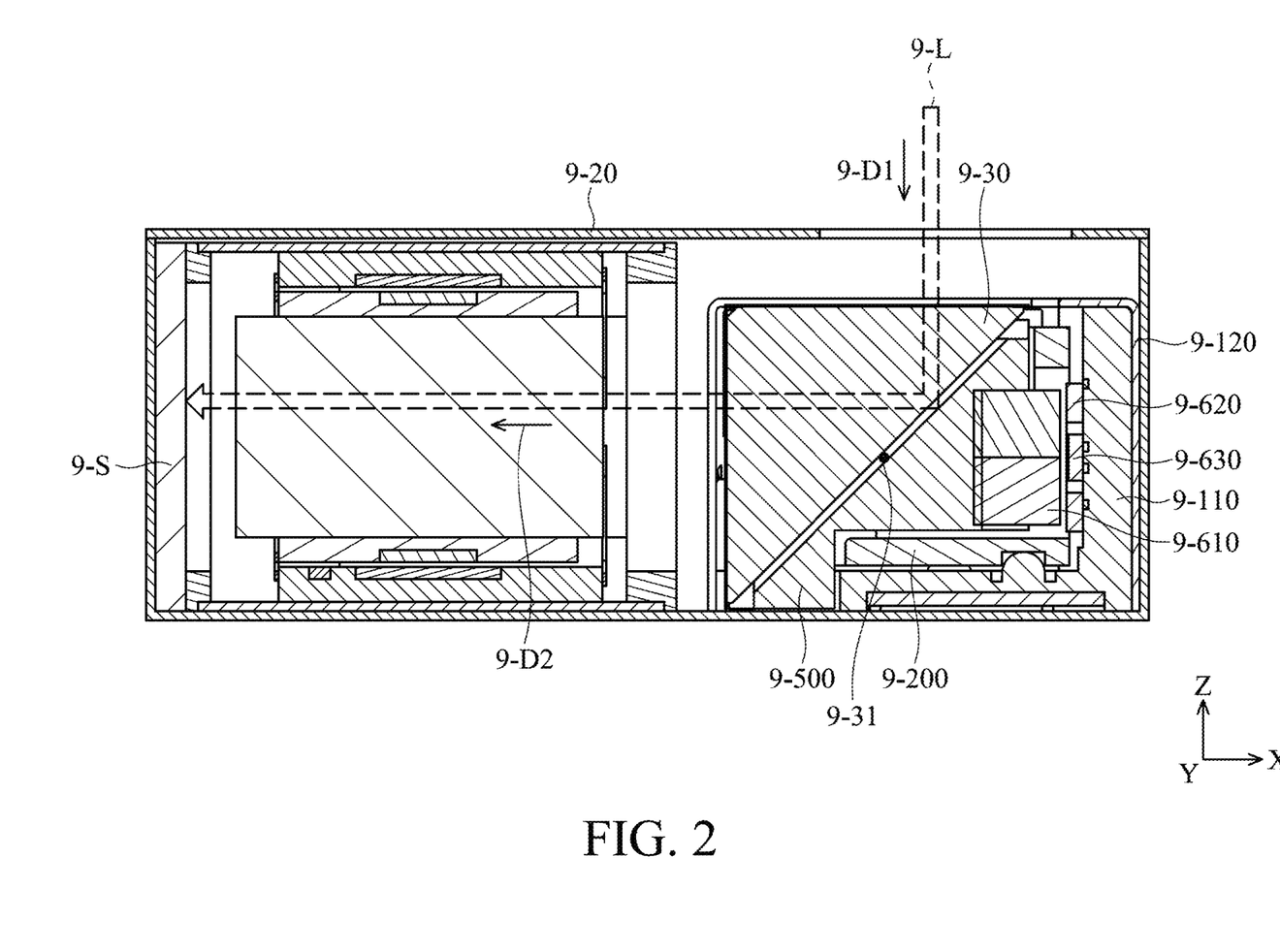
FIG. 2 is a partial cross-sectional view of the electronic device according to an embodiment of the invention.

Referring to FIGS. 1 and 2, in an embodiment of the invention, an optical member driving mechanism 9-10 can be disposed in an electronic device 9-20. The optical member driving mechanism 9-10 is configured to hold an optical member 9-30 and drive the optical member 9-30 to move relative to an image sensor module 9-S in the electronic device 9-20, so as to achieve the purpose of focus adjustment. For example, the electronic device 9-20 can be a digital camera or a smart phone having the function of capturing photographs or making video recordings, and the optical member 9-30 can be a prism or a mirror. When capturing photographs or making video recordings, a light 9-L enters the optical member driving mechanism 9-10 along an incident direction 9-D1, and moves along an outgoing direction 9-D2 to reach the image sensor module 9-S after reflected by the optical member 9-30.

Figure 3:
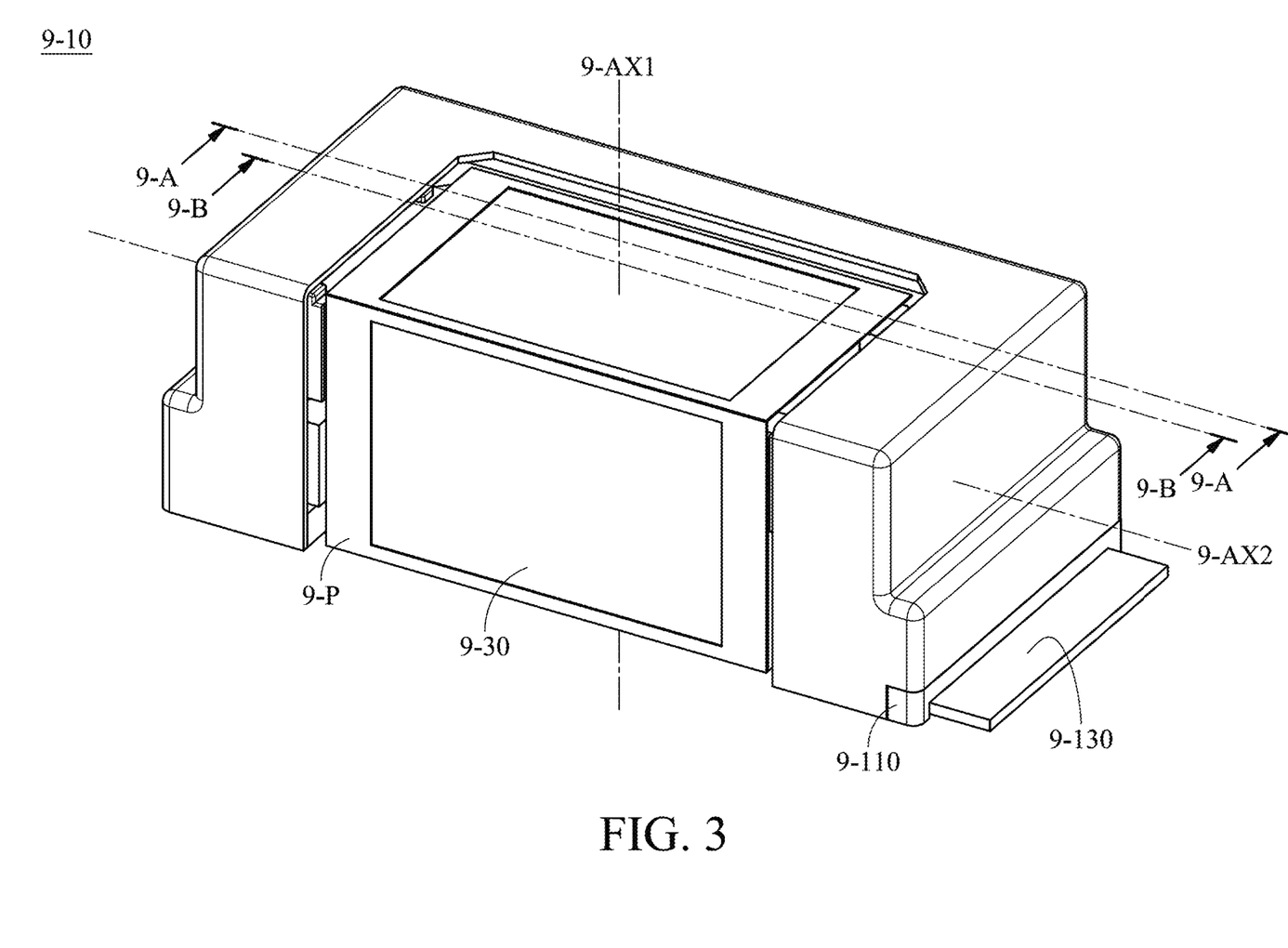
FIG. 3 is a schematic diagram of an optical member driving mechanism according to an embodiment of the invention.
Figure 4:
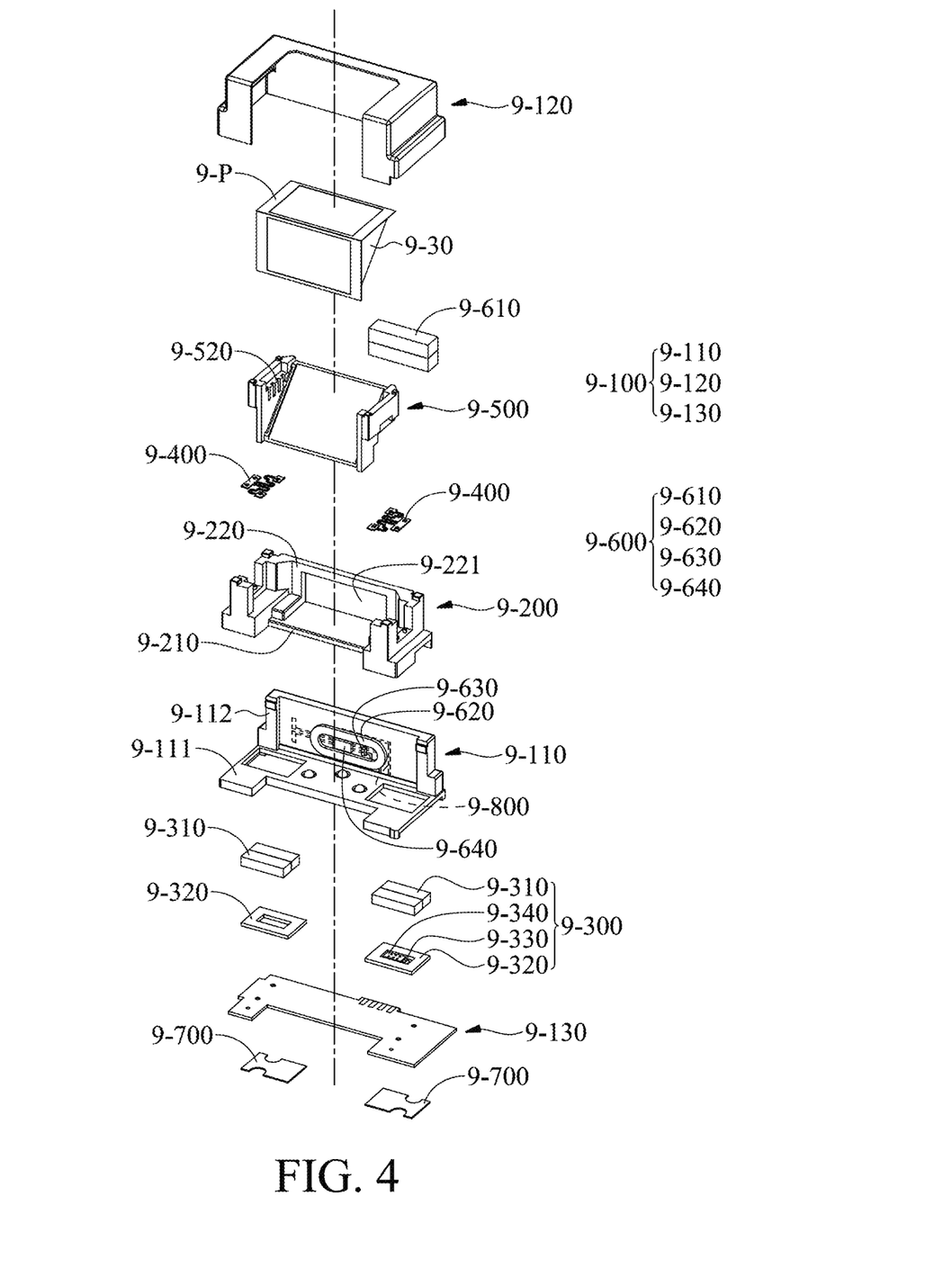
FIG. 4 is an exploded-view diagram of the optical member driving mechanism according to an embodiment of the invention.
Figure 5:
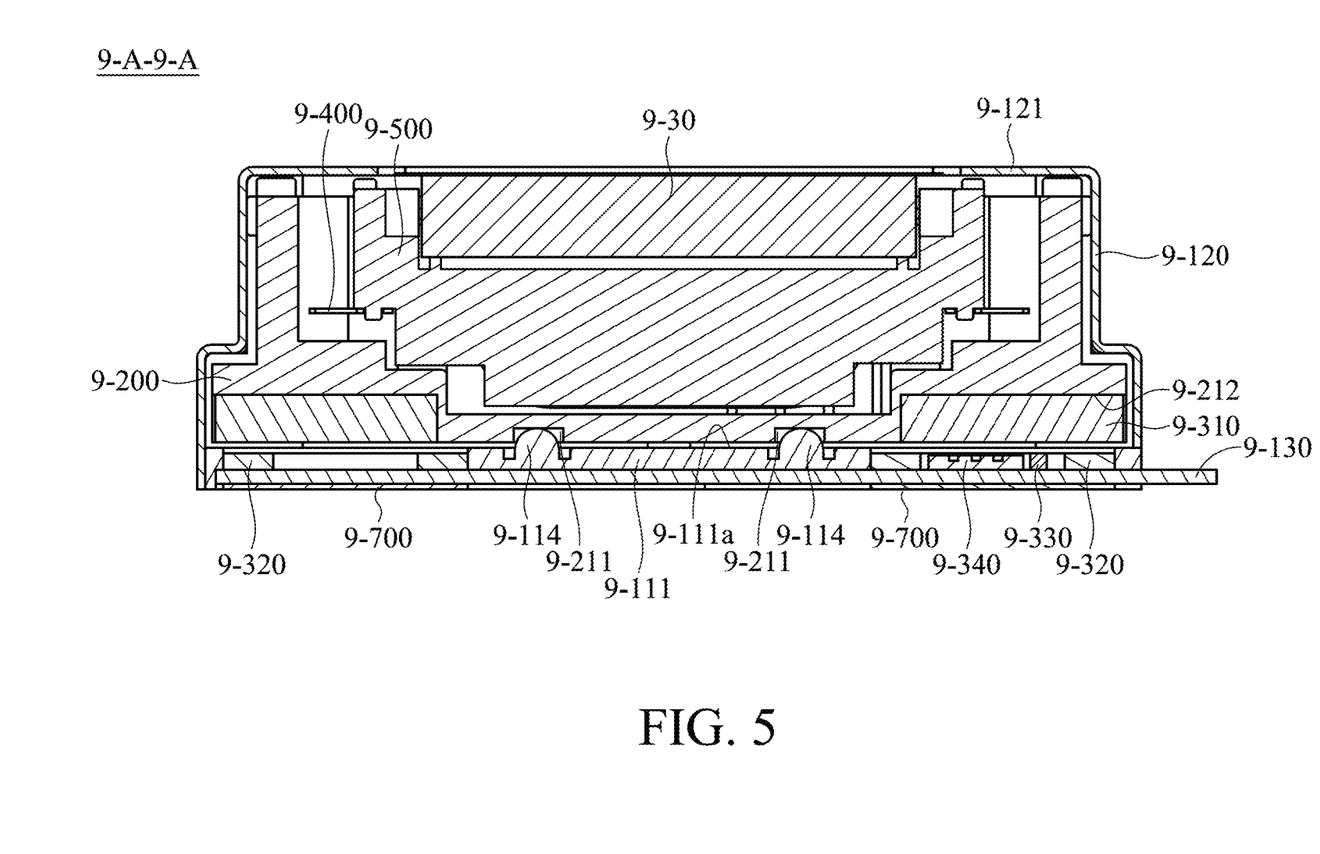
FIG. 5 is a cross-sectional view along the line 9-A-9-A in FIG. 3.

FIG. 3 is a schematic diagram of the optical member driving mechanism 9-10, FIG. 4 is an exploded-view diagram of the optical member driving mechanism 9-10, and FIG. 5 is a cross-sectional view along the line 9-A-9-A. As shown in FIGS. 3-5, the optical member driving mechanism 9-10 primarily includes a fixed portion 9-100, a first movable portion 9-200, a first driving assembly 9-300, at least one elastic member 9-400, a second movable portion 9-500, a second driving assembly 9-600, and at least one magnetic permeability member 9-700.

The fixed portion 9-100 includes a base 9-110, a housing 9-120, and a circuit board 9-130, wherein the base 9-110 and the housing 9-120 can be assembled using snap-fit joints or adhesive member. The base 9-110 has a bottom 9-111 and a back 9-112, and the back 9-112 is substantially perpendicular to the bottom 9-111. The circuit board 9-130 is disposed on the bottom 9-111, and the housing 9-120 and the circuit board 9-130 are disposed on the opposite sides of the bottom 9-111.

Figure 6:
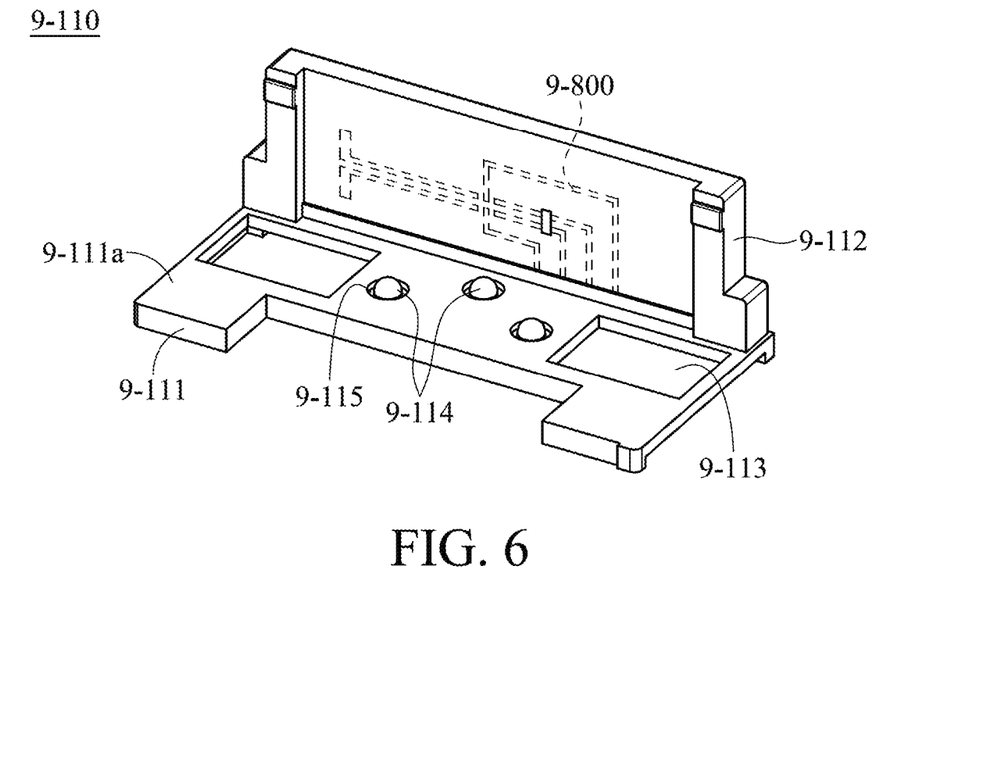
FIG. 6 is a schematic diagram of a base according to an embodiment of the invention.

As shown in FIG. 6, in this embodiment, at least one through hole 9-113 and at least one first guiding member 9-114 are formed on the bottom 9-111 of the base 9-110. The circuit board-130 is exposed from the through hole. The first guiding member 9-114 protrudes from a surface 9-111a of the bottom 9-111 facing the first movable portion 9-200. For example, the first guiding member 9-114 is a pillar, and the portion of the pillar protruding from the bottom 9-111 has a ball structure.

Furthermore, in this embodiment, at least one receiving recess 9-115 surrounding the pillar is formed on the surface 9-111a, and a plurality of wires 9-800 are embedded in the back 9-112 of the base 9-110. These wires 9-800 can be extended to electrically connect to the circuit board 9-130.

Figure 7:
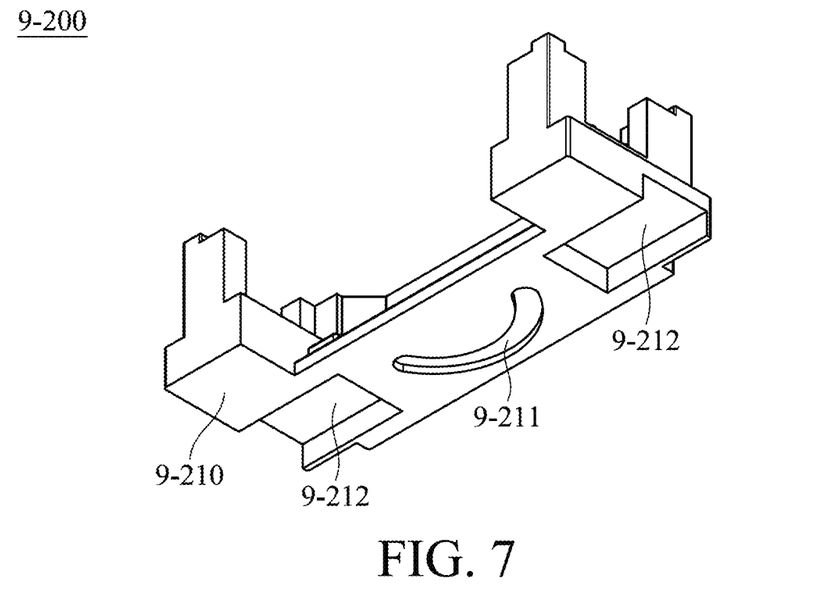
FIG. 7 is a schematic diagram of a first movable portion according to an embodiment of the invention.

The first movable portion 9-200 is a metal frame, and can be divided into a bottom 9-210 and a back 9-220. As shown in FIGS. 5 and 7, a second guiding member 9-211 and at least one accommodating recess 9-212 can be formed on a surface of the bottom 9-210 facing the base 9-110. In this embodiment, the second guiding member 9-211 is a guiding slot having an arc structure. When the first movable portion 9-200 is joined to the base 9-110, the first guiding member 9-114 (the pillar) is movably accommodated in the second guiding member 9-211 (the guiding slot), so as to restrict the direction and range of motion of the first movable portion 9-200. The position of the accommodating recess 9-212 corresponds to the position of the through hole 9-113 of the base 9-110.

Referring to FIGS. 3-5, the first driving assembly 9-300 includes at least one magnet 9-310, at least one coil 9-320, a position sensor 9-330, and a controller 9-340. The magnet 9-310 is affixed to the first movable portion 9-200 and accommodated in the accommodating recess 9-212. The coil 9-320, the position sensor 9-330 and the controller 9-340 are disposed on the circuit board 9-130 and accommodated in the through hole 9-113. Since the position of the accommodating recess 9-212 corresponds to the position of the through hole 9-113 of the base 9-110, the position of the magnet 9-310 corresponds to the position of the coil 9-320. When a current flows through the coil 9-320, an electromagnetic effect is generated between the magnet 9-310 and the coil 9-320, and the first movable portion 9-200 is driven to move relative to the fixed portion 9-100.

Since the pillar of the fixed portion 9-100 is movably disposed in the guiding slot of the first movable portion 9-200, when the first driving assembly 9-300 drives the first movable portion 9-200 to move relative to the fixed portion 9-100, the pillar slides along the guiding slot, and the first movable portion 9-200 rotates around a first rotation axis 9-AX1 (the Z-axis) relative to the fixed portion 9-100. In this embodiment, the first rotation axis 9-AX1 passes through the center of the guiding slot.

Since the first movable portion 9-200 and the base 9-110 are made of metal, and the first guiding member 9-114 has a ball structure, the debris caused by the friction between the first guiding member 9-114 and the second guiding member 9-211 can be reduced. In this embodiment, a lubricant can be coated on the first guiding member 9-114, so that the first movable portion can move more smoothly. Since the receiving recess 9-115 is formed around the first guiding member 9-114, the redundant lubricant can flow into the receiving recess 9-115 and will not cause a short circuit.

Furthermore, the magnetic permeability member 9-700 is disposed on the circuit board 9-130 and corresponded to the magnet 9-310 of the fixed portion 9-100. Therefore, the first movable portion 9-200 can tightly abut against the base 9-110 according to the magnetic attraction force between the magnetic permeability member 9-700 and the magnet 9-310. The separation between the first movable portion 9-200 and the base 9-110 can be avoided.

The position sensor 9-330 is electrically connected to the controller 9-340, and the controller 9-340 is electrically connected to the coil 9-320. The position sensor 9-330 is configured to detect the position of the magnet 9-310, so as to obtain the rotation angle of the first movable portion 9-200 relative to the base 9-110. The controller 9-340 can determine the strength of the current providing to the coil 9-320 according to the detection result of the position sensor 9-330.

For example, the position sensor 9-330 can be a Hall sensor, a magnetoresistance effect sensor (MR sensor), a giant magnetoresistance effect sensor (GMR sensor), a tunneling magnetoresistance effect sensor (TMR sensor), or a fluxgate sensor, and the controller 9-340 can be a driver IC.

Figure 8:
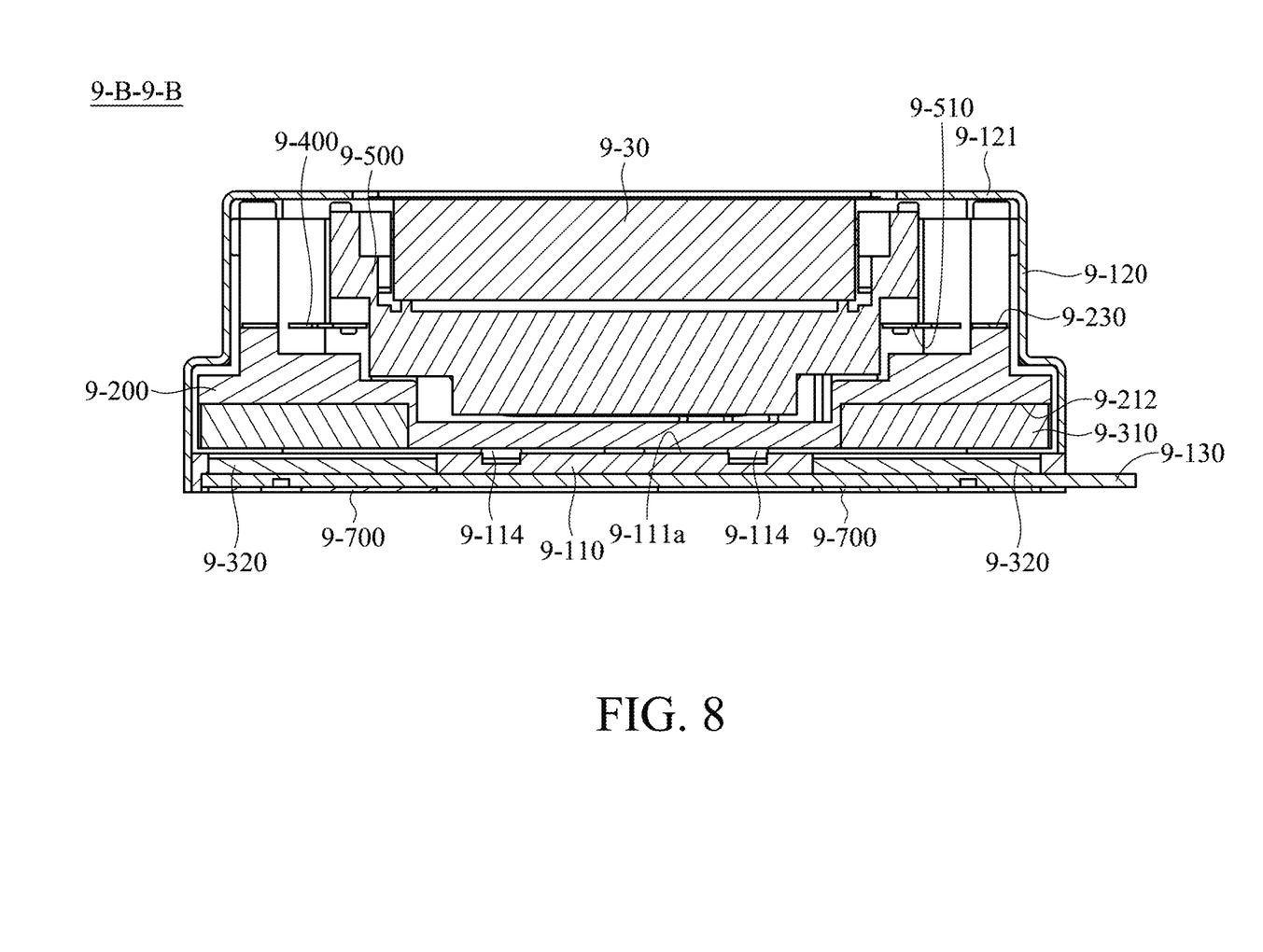
FIG. 8 is a cross-sectional view along the line 9-B-9-B in FIG. 3.

The second movable portion 9-500 can be an optical member holder, and it can be suspended on the first movable portion 9-200 via the elastic member 9-400. As shown in FIG. 8, the first movable portion 9-200 has an upper surface 9-230, and the second movable portion 9-500 has a lower surface 9-510. The upper surface 9-230 faces the top wall 9-121 of the housing 9-120, and the lower surface 9-510 faces the base 9-110. The elastic member 9-400 connects the upper surface 9-230 to the lower surface 9-510. Thus, the reverse of the second movable portion 9-500 caused by an external force impacting the optical member driving mechanism 9-10 can be avoided.

As shown in FIG. 5, in this embodiment, the distance between the first movable portion 9-200 and the top wall 9-121 of the housing 9-120 is less than the second movable portion 9-500 and the top wall 9-121 of the housing 9-120.

Referring to FIGS. 2-6, the second driving assembly 9-600 includes at least one magnet 9-610, at least one coil 9-620, a position sensor 9-630, and a controller 9-640. The magnet 9-610 is affixed to the second movable portion 9-500. The coil 9-620, the position sensor 9-630 and the controller 9-640 are affixed to the back 9-112 of the base 9-110. The coil 9-620, the position sensor 9-630 and the controller 9-640 are electrically connected to each other, and correspond to the magnet 9-640 through an opening 9-220 of the first movable portion 9-200.

When a current flows through the coil 9-620, an electromagnetic effect is generated between the magnet 9-610 and the coil 9-620, and the second movable portion 9-500 is driven to rotate around a second rotation axis 9-AX2 (the Y-axis) relative to the fixed movable portion 9-200.

The optical member 9-30 is disposed on the second movable portion 9-500. For example, a plurality of slots 9-520 are formed on the inner surface of the second movable portion 9-500, when the optical member 9-30 is disposed on the second movable portion 9-500, the user can pour an adhesive glue into the slots 9-520, so as to affix the optical member 9-30 to the second movable portion 9-500 at its lateral surfaces. Furthermore, a shield member 9-P (such as a tape or an ink) is disposed on the edge of the optical member 9-30, so as to reduce the stray light.

Since the optical member 9-30 is disposed on the second movable portion 9-500, when the second driving assembly 9-600 drives the second movable portion 9-500 to rotate, the optical member 9-30 is driven simultaneously and rotates around the second rotation axis 9-AX2 relative to the first movable portion 9-200. Moreover, since the second movable portion 9-500 is connected to the first movable portion 9-200 via the elastic member 9-400, when the first driving assembly 9-300 drives the first movable portion 9-200 to rotate, the second movable portion 9-500 and the optical member 9-30 is driven to rotate around the first rotation axis 9-AX1 relative to the fixed portion 9-100 simultaneously.

In this embodiment, the center of the arc structure of the second guiding member 9-211 is aligned with the center 9-31 of the optical member 9-30 as seen from the incident direction 9-D1.

Referring to FIGS. 9-12, in another embodiment, the optical member driving mechanism 9-10' includes a fixed portion 9-100', a first fixed portion 9-200', a first driving assembly 9-300, at least one elastic member 9-400, a second movable portion 9-500, and a second driving assembly 9-600. The structures and the connecting relationships of the first driving assembly 9-300, the elastic member 9-400, the second movable portion 9-500, and the second driving assembly 9-600 in this embodiment are the same as that in the aforementioned embodiment, so that the features thereof are not repeated in the interest of brevity.

Figure 9:
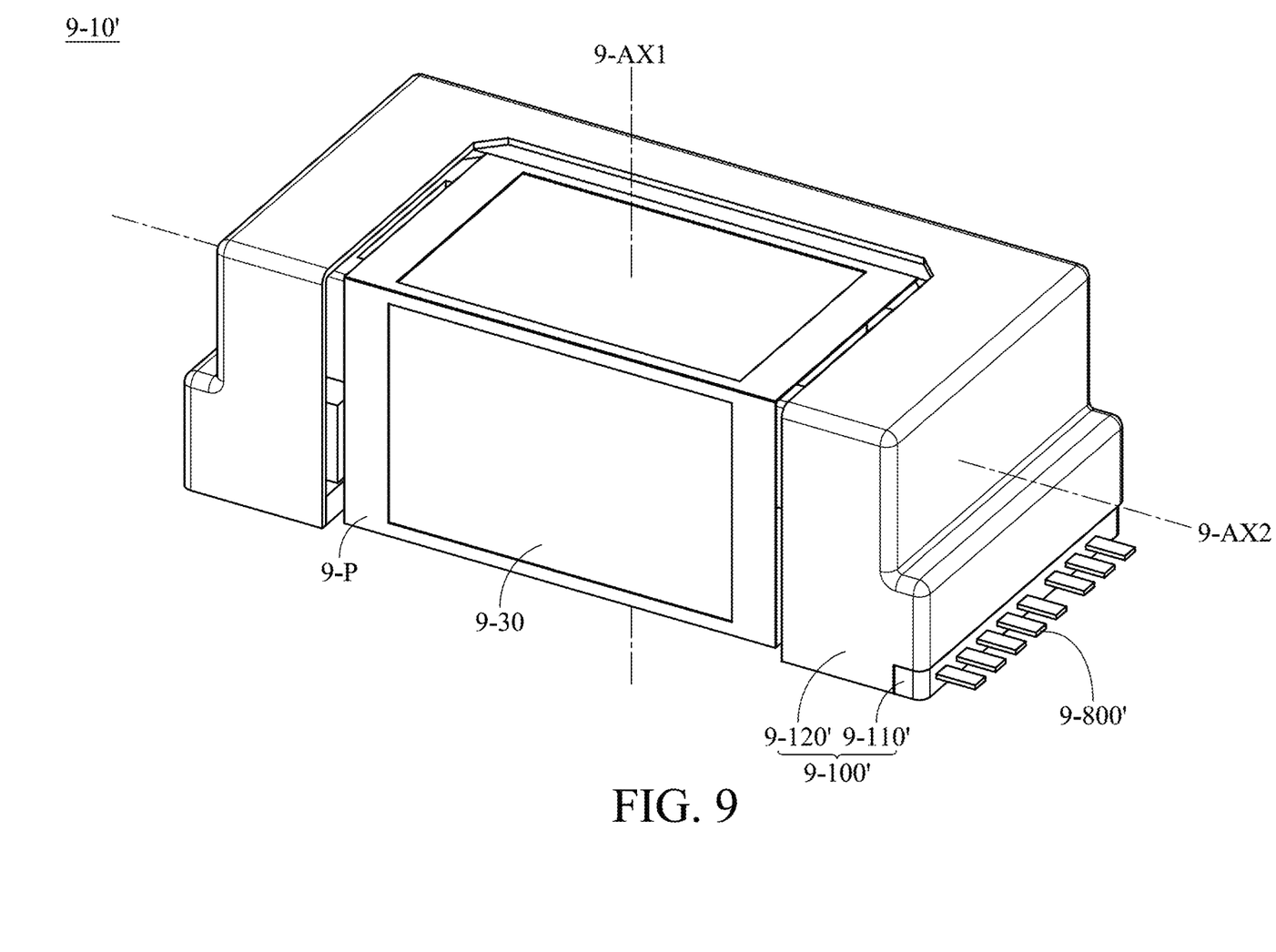
FIG. 9 is a schematic diagram of an optical member driving mechanism according to another embodiment of the invention.
Figure 10:
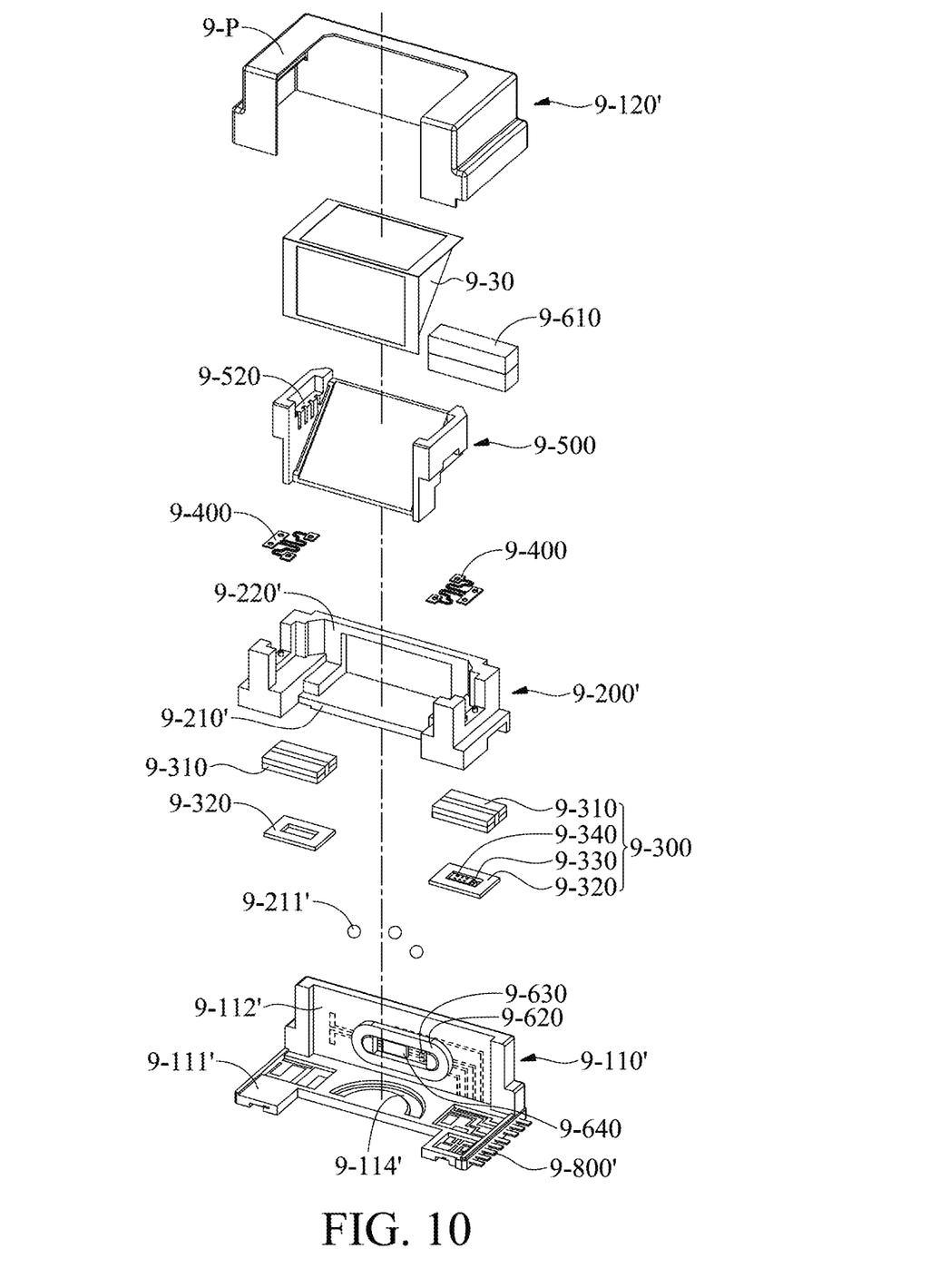
FIG. 10 is a exploded-view diagram of the optical member driving mechanism according to another embodiment of the invention.

The fixed portion 9-100' includes a base 9-110' and a housing 9-120'. The base 9-110' has a bottom 9-111' and a back 9-112', and the back 9-112' is substantially perpendicular to the bottom 9-111'. The difference between this embodiment and the aforementioned embodiment is in that the wires 9-800' are not only embedded in the back 9-112', but also embedded in the bottom 9-111'. The first guiding member 9-114' on the bottom 9-111' is a guiding slot having an arc structure. The center of the arc structure is aligned with the center 9-31 of the optical member 9-30 as seen from the incident direction 9-D1.

The wires 9-800' are magnetic, and at least a portion of the wires 9-800' embedded in the base 9-111' corresponds to the magnet 9-310 of the first driving assembly 9-300. Therefore, the first movable portion 9-200' can tightly abut against the base 9-110' according to the magnetic attraction force between the wires 9-800' and the magnet 9-310. The separation between the first movable portion 9-200' and the base 9-110' can be avoided.

Figure 12:
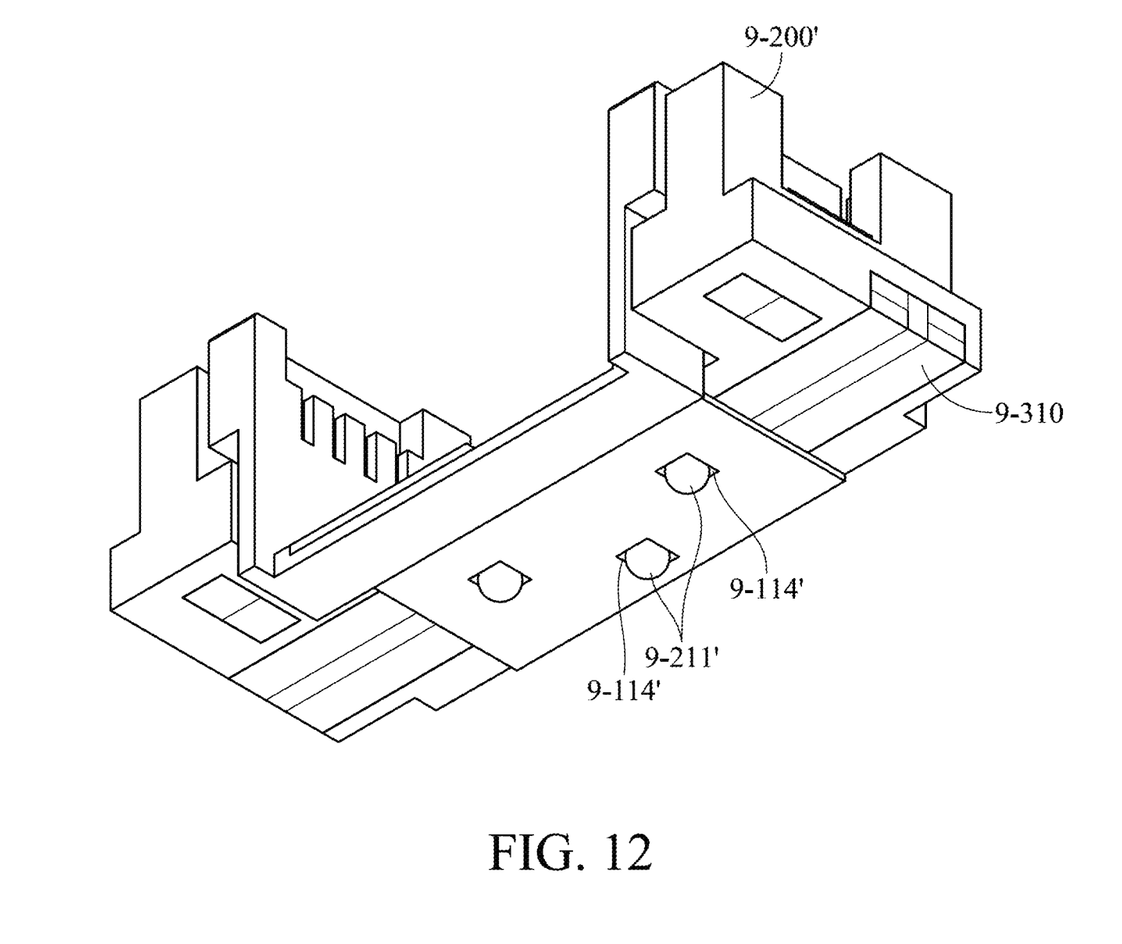
FIG. 12 is a schematic diagram of a second guiding member accommodated in a depression according to another embodiment of the invention.

The first movable portion 9-200' is a metal frame, and can be divided into a bottom 9-210' and a back 9-220'. The second guiding member 9-211' disposed on the bottom 9-210' is a ball, and at least one depression 9-240' can be formed on the bottom 9-210' to accommodate the ball. When the first movable portion 9-200' and the base 9-110' are joined, the ball is movably accommodated in the guiding slot. Therefore, when the first driving assembly 9-300 drives the first movable portion 9-200' to move relative to the fixed portion 9-100' the ball rolls along the guiding slot, and the first movable portion 9-200' rotates around the first rotation axis 9-AX1 (the Z-axis) relative to the fixed portion 9-100'.

Figure 11:
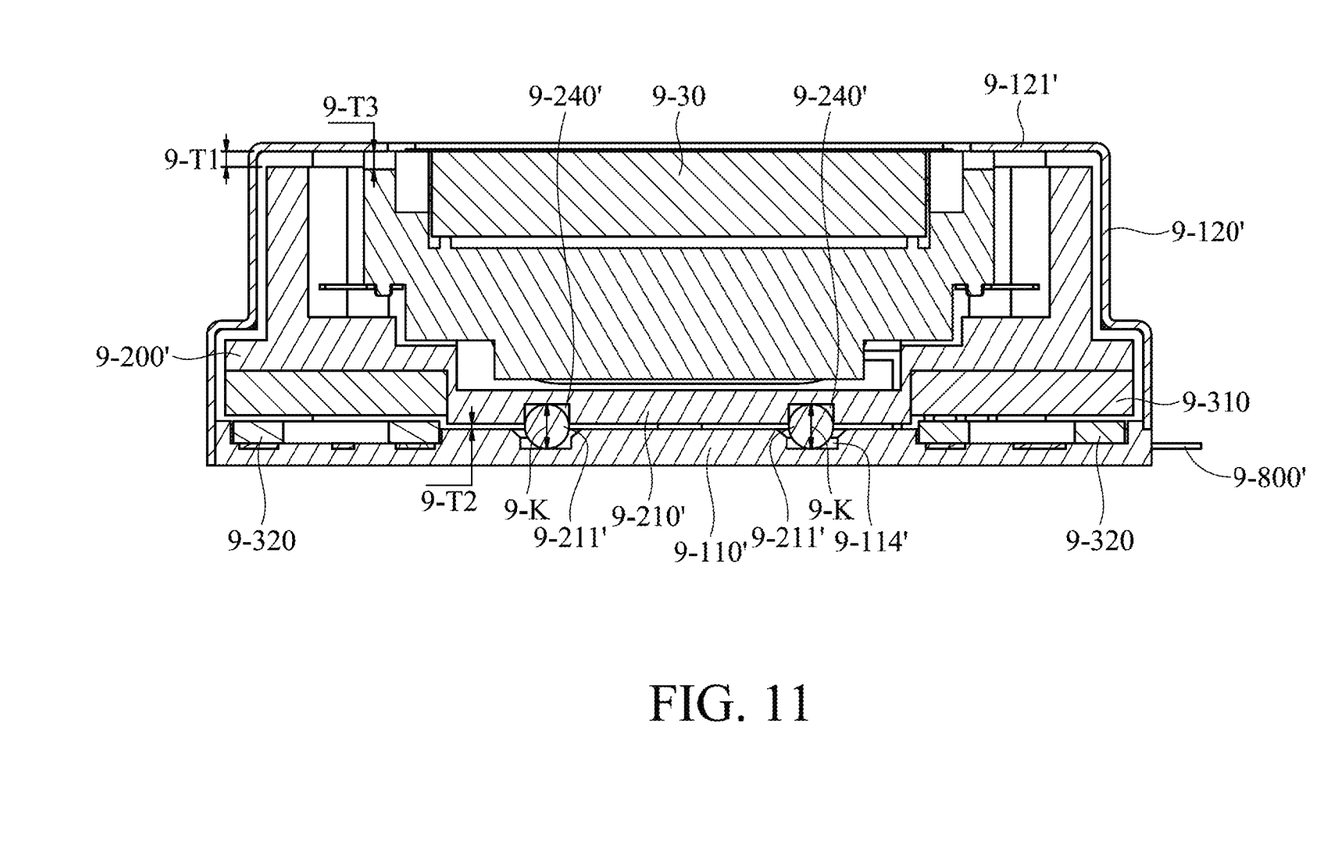
FIG. 11 is a cross-sectional view of the optical member driving mechanism according to another embodiment of the invention.

It should be noted that, as shown in FIG. 11, in this embodiment, in the incident direction 9-D1, the shortest distance between the first movable portion 9-200' and the top wall 9-121' of the housing 9-120' is a first distance 9-T1, the shortest distance between the first movable portion 9-200' and the base 9-110' is a second distance 9-T2, and the second guiding member 9-211' has a thickness 9-K. The thickness 9-K is greater than the sum of the first distance 9-T1 and the second distance 9-T2, so as to prevent the ball (the second guiding member 9-211') separating from the guiding slot (the first guiding member 9-114'), which may be happened when an external force impacts the optical member driving mechanism 9-10' and a greater gap is formed between the first movable portion 9-200' and the base 9-110'. Furthermore, in the incident direction 9-D1, the shortest distance between the second movable portion 9-200' and the top wall 9-121' is a third distance 9-T3, and the first distance 9-T1 is less than the third distance 9-T3.

In summary, an optical member driving mechanism is provided, including a first movable portion, a fixed portion, and a first driving assembly. The first movable portion is connected to an optical member. The first movable portion is movable relative to the fixed portion. The first driving assembly is configured to drive the first movable portion to move relative to the fixed portion.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical member driving mechanism, comprising:
    a first movable portion, configured to connect an optical member, wherein light enters the optical member from an incident surface of the optical member along an incident direction;
    a fixed portion, wherein the first movable portion can move relative to the fixed portion;
    a first driving assembly, configured to drive the first movable portion to move relative to the fixed portion and comprising a pair of coils, wherein a winding axis of each of the coils is parallel to the incident direction;
    a guiding slot, having an arc structure and formed on a surface of the fixed portion that is parallel to the incident surface; and
    at least three guiding elements, disposed between the coils and engaged with the guiding slot, wherein the guiding elements are separated from each other, and the coils and the guiding elements are disposed on a same side of the first movable portion,
    wherein as seen from the incident direction, the first movable portion has a plurality of depressions for accommodating the guiding elements, and dimensions of each of the depressions are substantially the same as dimensions of each of the guiding elements.

2. The optical member driving mechanism as claimed in claim 1, wherein the optical member is configured to adjust an emission direction of light from the incident direction to an outgoing direction, and the first driving assembly is configured to drive the first movable portion to rotate around a first rotation axis relative to the fixed portion, wherein the incident direction is not parallel to the outgoing direction, and the first rotation axis is parallel or perpendicular to the incident direction.

3. The optical member driving mechanism as claimed in claim 2, wherein the optical member driving mechanism further comprises:
    a second movable portion; and
    a second driving assembly, configured to drive the second movable portion to move relative to the first movable portion and the fixed portion, wherein at least a portion of the first driving assembly is disposed on the first movable portion, and at least a portion of the second driving assembly is disposed on the second movable portion.

4. The optical member driving mechanism as claimed in claim 3, wherein the optical member driving mechanism further comprises an elastic member, connecting the first movable portion to the second movable portion.

5. The optical member driving mechanism as claimed in claim 4, wherein the fixed portion comprises a base and a housing having a top wall, the first movable portion has an upper surface facing the top wall, and the second movable portion has a lower surface facing the base, wherein the elastic member is connected to the upper surface and the lower surface.

6. The optical member driving mechanism as claimed in claim 2, wherein the first driving assembly further comprises a pair of magnets, the magnets and the coils are respectively disposed on the first movable portion and the fixed portion, and the optical member driving mechanism further comprises a plurality of wires embedded in the fixed portion, wherein the wires are magnetic, and at least a portion of the wires correspond to the magnet.

7. The optical member driving mechanism as claimed in claim 2, wherein the first driving assembly further comprises a pair of magnets, the magnets and the coils are respectively disposed on the first movable portion and the fixed portion, and the optical member driving mechanism further comprises a magnetic permeability member disposed on the fixed portion and corresponding to the magnet.

8. The optical member driving mechanism as claimed in claim 2, wherein the guiding elements are disposed on the first movable portion and movably connected to the guiding slot.

9. The optical member driving mechanism as claimed in claim 8, wherein the guiding elements are balls.

10. The optical member driving mechanism as claimed in claim 9, wherein the depressions are separated from each other, and the balls are accommodated in the depressions.

11. The optical member driving mechanism as claimed in claim 2, wherein the fixed portion comprises a base and a housing having a top wall, wherein in the incident direction, a shortest distance between the first movable portion and the top wall is a first distance, a shortest distance between the second movable portion and the top wall is a third distance, and the first distance is different from the third distance.

12. The optical member driving mechanism as claimed in claim 11, wherein the first distance is less than the third distance.

13. The optical member driving mechanism as claimed in claim 2, wherein the optical member driving mechanism further comprises a shield member, disposed on an edge of the optical member.

14. The optical member driving mechanism as claimed in claim 1, wherein a center of the arc structure is aligned with a center of the optical member as seen from the incident direction.

15. The optical member driving mechanism as claimed in claim 1, wherein the guiding elements are pillars that are disposed on the fixed portion, and the pillars protrude from a surface of the fixed portion facing the second movable portion.

16. The optical member driving mechanism as claimed in claim 15, wherein the fixed portion further comprises a plurality of receiving recesses, formed on the surface and surrounding the pillars.

17. The optical member driving mechanism as claimed in claim 15, wherein the guiding slot has an arc structure.

18. The optical member driving mechanism as claimed in claim 17, wherein the center of the arc structure is aligned with the center of the optical member as seen from the incident direction.

19. An optical member driving mechanism, comprising:
a first movable portion, configured to connect an optical member, wherein light enters the optical member along an incident direction;
a fixed portion, wherein the first movable portion can move relative to the fixed portion;
a first driving assembly, configured to drive the first movable portion to move relative to the fixed portion;
a guiding slot, disposed on the first movable portion or the fixed portion; and
a plurality of guiding elements, engaged with the guiding slot,
wherein the fixed portion comprises a base and a housing having a top wall, wherein in the incident direction, a shortest distance between the first movable portion and the top wall is a first distance, a shortest distance between the first movable portion and the base is a second distance, and the guiding elements have a thickness, wherein the thickness is greater than a sum of the first distance and the second distance, wherein the first distance, the second distance, and the thickness are measured from a same direction.

20. An optical member driving mechanism, comprising:
a first movable portion, configured to connect an optical member, wherein light enters the optical member from an incident surface of the optical member along an incident direction;
a fixed portion, wherein the first movable portion can move relative to the fixed portion;
a first driving assembly, configured to drive the first movable portion to move relative to the fixed portion and comprising a pair of coils, wherein a winding axis of each of the coils is parallel to the incident direction;
a guiding slot, having an arc structure and formed on a surface of the first movable portion that is parallel to the incident surface; and
at least three guiding elements, disposed between the coils and engaged with the guiding slot, wherein the guiding elements are separated from each other, and the coils and the guiding elements are disposed on a same side of the first movable portion,
wherein as seen from the incident direction, the fixed portion has a plurality of depressions for accommodating the guiding elements, and dimensions of each of the depressions are substantially the same as dimensions of each of the guiding elements.

* * * * *